May 1, 1928.
O. P. ANDERSON
1,668,478
COMBINATION CHEESE AND CAKE KNIFE
Filed Aug. 6, 1926
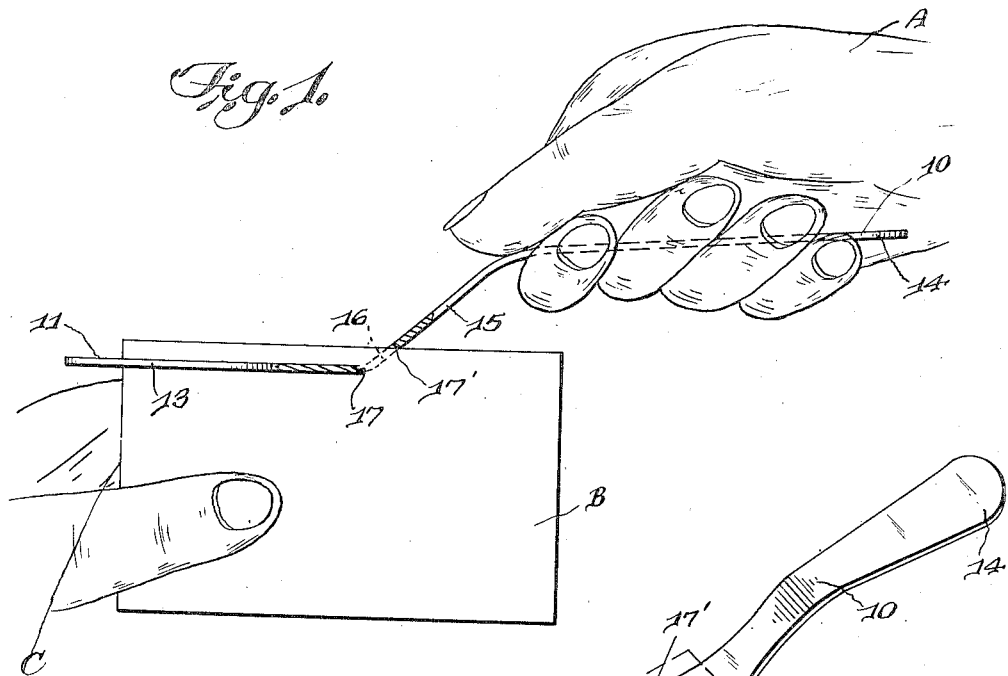
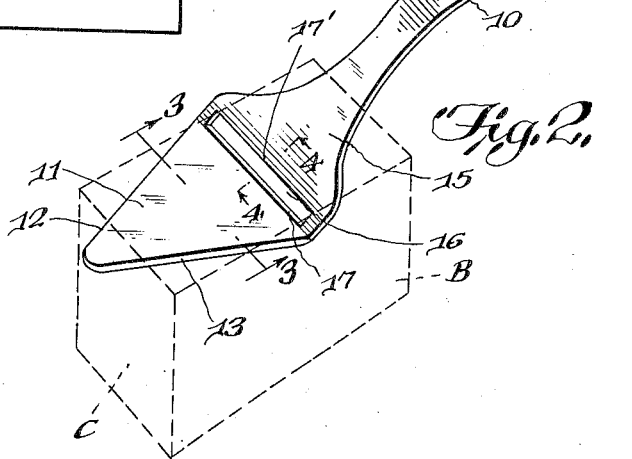
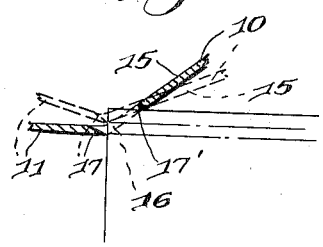
Olaf P. Anderson
INVENTOR
Victor J. Evans
ATTORNEY Patented May 1, 1928.

1,668,478

UNITED STATES PATENT OFFICE.

OLAF PAUL ANDERSON, OF CHICAGO, ILLINOIS.

COMBINATION CHEESE AND CAKE KNIFE.

Application filed August 6, 1926. Serial No. 127,633.

This invention relates to a combination cheese and cake knife and has for its principal object the provision of an improved construction of this character which will be highly efficient in use.

One of the many objects of my invention is the production of an article of this character which will be simple in structure, durable in use, comparatively inexpensive in production, and having a slicing blade which may be expeditiously positioned to regulate its depth and penetration and cut.

Other objects will appear hereinafter.

The invention consists in the novel combination and arrangement of parts which will be hereinafter described and claimed.

The invention will be best understood by reference to the accompanying drawings showing the preferred form of construction and in which:

Fig. 1 is a longitudinal vertical sectional detail view of the invention,

Figure 2 is a perspective view of the same,

Fig. 3 is a sectional detail view taken substantially on line 3—3 of Fig. 2, and Fig. 4 is a fragmentary sectional detail view taken substantially on line 4—4 of Fig. 2 illustrating the device positioned in various adjusted positions to regulate the slicing blade according to the thickness of the sliced edible desired.

To accomplish the various objects of my invention I form my invention from a single piece of material 10 thereby affording an inexpensive article of this character.

The body 10 defines a supporting arm 11 having its side edges 12 and 13 extending toward each other to define the substantially triangular supporting arm 11, Fig. 2.

The body 10 further defines a handle portion 14 and this handle portion is formed as an integral part of the supporting arm 11 and at the junction between the handle 10 and the supporting arm 11 is an upwardly inclined intermediate portion 15. This portion 15 defines an elongated slot 16 providing a cutting edge 17 at its lower side, this cutting edge 17 being disposed transversely of the supporting arm 11 and disposed in substantially the same plane as the supporting arm 11.

As shown in Fig. 3 of the drawing the edge 13 of the supporting arm 11 is bevelled to define a cutting edge whereas the edge 12 is substantially blunt. In use to slice a cake of cheese the handle 14 is firmly grasped by the hand A and the supporting arm is disposed in position with the cake of cheese B to position the slicing edge 17 in cutting position with the adjacent end wall C of the cake of cheese B. The article in this position is drawn across the top portion of the cake of cheese to operate the cutting edge 17 upon the cake of cheese in a direction to slice the cake of cheese transversely.

To regulate the thickness of the slice of cheese desired it is only necessary to tilt the handle 14 downwardly raising the supporting arm 11, which arm 11 receives the slice of cheese. By tilting the handle 14 in a downward direction the inner edge 17' of the slot 16 will be positioned on the top surface of the cake of cheese disposing the slicing edge 17 in a plane nearer to the top plane of the cake of cheese.

One feature of the invention resides in the fact that the sliced cheese does not come into contact with the hands of the slicer because as the cheese is sliced the sliced cheese is received by the supporting arm and conveyed to the dish for the reception of the sliced cheese.

It is manifest that by turning the article in a direction to dispose the cutting edge B below the edge 12 that this cutting edge 13 can be used for slicing cake or the like and that after the cake has been sliced the cake can be picked up and conveyed to a dish by the use of the arm 11.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

The invention having been set forth, what I claim as new and desire to secure by Letters Patent is:

1. A combination cheese and cake knife including a substantially triangularly shaped supporting arm, a handle portion, and an intermediate portion connecting the base of said triangularly shaped arm to said handle portion and disposed at an angle to said arm and said handle whereby to dispose said handle and said arm in offset parallelly extending planes, and a portion struck from said intermediate portion in juxtaposition to the base of said trianagularly shaped arm, said struck portion being beveled at the free edge thereof to provide a cutting edge.

2. A combination which is a cake knife formed from a single piece of material shaped to provide a substantially triangularly shaped supporting arm, and a handle portion, said portion and said arm being offset from each other and disposed in parallel planes, and an intermediate portion disposed between and at an angle to said arm and said handle, a portion struck from said intermediate portion along the line of juncture of said intermediate portion and said supporting arm in a direction away from said supporting arm, said portion being beveled at the free edge thereof to provide a cutting edge, and one edge of said triangularly-shaped portion being beveled to provide a cutting edge.

In testimony whereof I affix my signature.

OLAF PAUL ANDERSON.